Dec. 31, 1963  H. CAREW ETAL  3,115,991
CUTTING BLADE MAGAZINE AND DISPENSER
Original Filed March 3, 1958
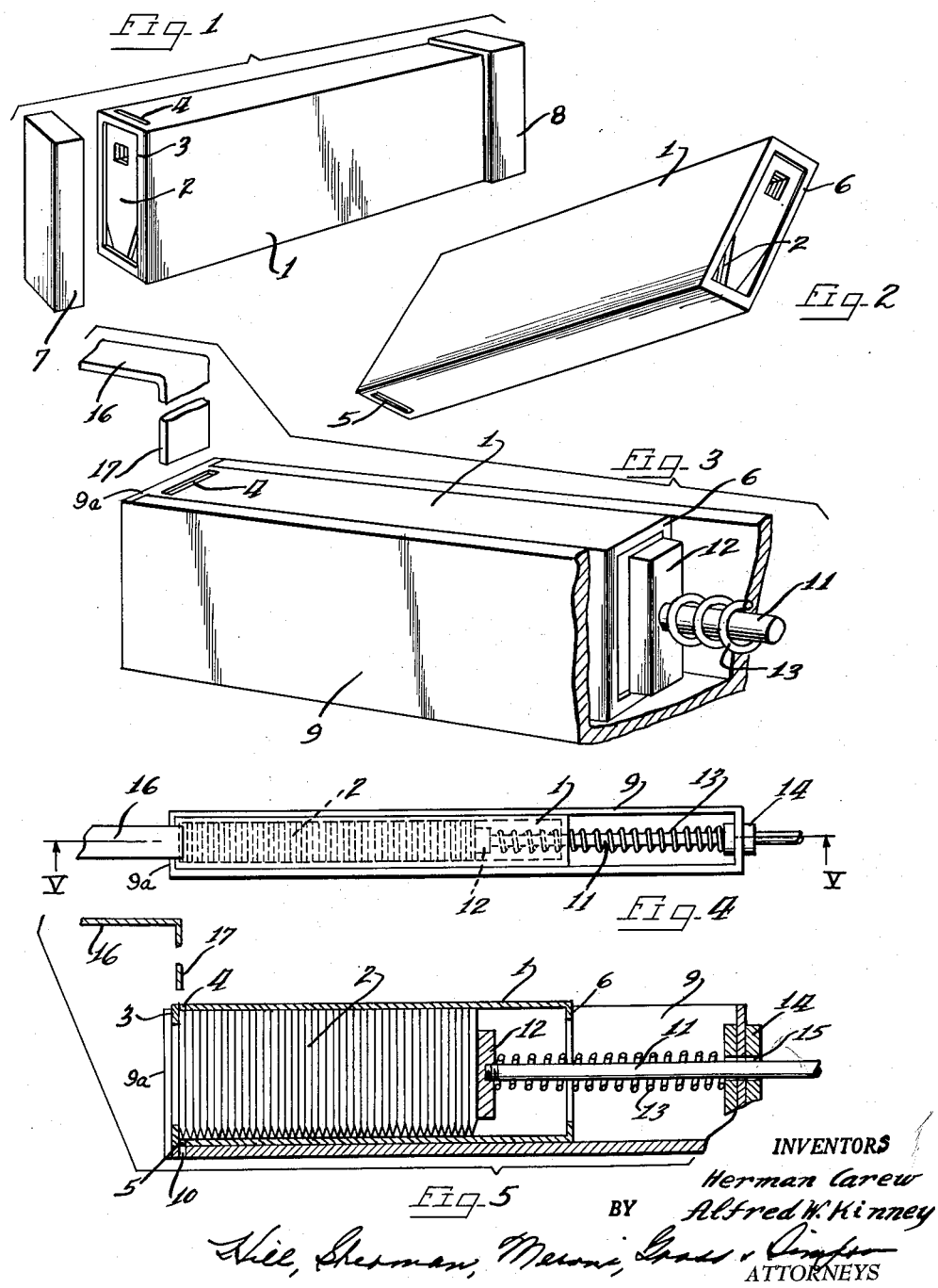
INVENTORS
Herman Carew
BY Alfred W. Kinney
Hill, Sherman, Meroni, Gross &
ATTORNEYS

United States Patent Office 3,115,991
Patented Dec. 31, 1963

3,115,991
CUTTING BLADE MAGAZINE AND DISPENSER
Herman Carew, Tarpon Springs, Fla., and Alfred W. Kinney, Washington, D.C., assignors to American Can Company, New York, N.Y., a corporation of New Jersey
Original application Mar. 3, 1958, Ser. No. 718,683. Divided and this application July 31, 1961, Ser. No. 127,986
1 Claim. (Cl. 221—198)

This invention relates to improvements in a cutting blade magazine and dispenser, and more particularly to a magazine containing a stack of cutting blades, and the association of that magazine with dispensing means for the successive removal of cutting blades one at a time from the magazine, the invention being highly desirable for supplying cutting blades to automatic can opening apparatus, wherein the cutting blades are used but once and then discarded, although the invention will have other uses and purposes as will be apparent to one skilled in the art.

The instant application is a division of our copending application entitled "Method of and Apparatus for Dispensing Hot Foods," filed March 3, 1958, Serial No. 718,683, now Patent No. 3,080,078.

While various types of magazines for cutting blades, such for example as razor blades, have been developed in the past, there has been no development of a magazine particularly suitable for successively supplying blades to automatic can opening mechanism, because such mechanism did not utilize a blade but once for opening cans of food particularly, prior to the advent of the invention set forth in our aforesaid copending application.

Accordingly, it is an important object of the instant invention to provide a magazine for cutting blades of the type that will open the commonly known tin can, the magazine being so constructed as to permit the rapid dispensing of the blades therefrom one at a time.

Another object of the invention is the provision of a dispenser or magazine for cutting blades, wherein the blades may be kept in a sterile condition, and the blades need not be touched by the hands of the operator when the magazine is put to use.

A further object of this invention is the provision of a magazine for cutting blades comprising a container in which a stack of blades are disposed, the container being open ended and provided with easily removable end caps when the magazine is put to use.

Also a feature of the invention is the provision of a magazine for cutting blades comprising a simple form of a container wtih a stack of cutting blades therein, the container being open ended but having a marginal wall at one end to overlie marginal portions of the terminal blade to keep the blades in the stack, the container having a slot adjacent said wall through which the blades may be dispensed one at a time.

It is a further object of this invention to provide a magazine for cutting blades and dispensing means for the blades, including a container for a stack of blades having a slot adjacent one end thereof through which the blades may be pushed one at a time, and a housing in which the magazine is disposed, with resilient means urging the blades toward the slotted end of the container.

While some of the more salient features, characteristics and advantages of the instant invention have been above pointed out, others will become apparent from the following disclosures, taken in conjunction wtih the accompanying drawing, in which:

FIGURE 1 is a perspective view of a cutting blade magazine embodying principles of the innstant invention, showing the left-hand cover or cap removed;

FIGURE 2 is also a perspective view of the magazine of FIGURE 1, showing particularly the rear end of the magazine, and with both caps removed;

FIGURE 3 is a fragmentary perspective view illustrating the disposition of the cutting blade magazine in operative association with dispensing means;

FIGURE 4 is a fragmentary reduced top plan view of the structure shown in FIGURE 3; and FIGURE 5 is an enlarged fragmentary vertical sectional view through the structure of FIGURES 3 and 4, with parts shown in elevation, taken substantially as indicated by line V—V of FIGURE 4.

As shown on the drawings:

The illustrated embodiment of the instant invention comprises a container 1, tubular in shape with open ends, and which may be satisfactorily made of paperboard, cardboard, light metal, or other suitable material. Preferably the container has a cross-sectional shape generally in keeping with the overall shape of the blades therein, and in the illustrated instance the container is rectangular in cross-section. A stack of cutting blades 2 is disposed within the container, the blades being arranged in alignment and in compact order so as to initially fill the container to full capacity. The cross-sectional area of the container is such as to intimately enclose the blades but permit free sliding movement of the blades along the container toward the dispensing or discharging end thereof.

At the discharge end thereof the container is provided with a marginal wall 3 which extends inwardly sufficiently to overlie or overlap marginal portions of the terminal blade in the stack, as seen in FIGURES 1 and 5. Also at the discharge end the container is provided in its upper wall or side with a slot 4, and a similar and opposed slot 5 in its underside, these slots being of suitable size to accommodate a discharge tool and permit the passage of the terminal blade of the stack, respectively. This terminal blade of the stack will not fall through the slot 5 unintentionally owing to the friction thereon of the marginal wall 3 and the next adjacent blade, the blades being packed relatively tightly in the container.

At the opposite end thereof the container is also provided with a marginal wall 6 similar to the marginal wall 3, and this wall 6 may be shaped on the container after the container has been filled with a supply of cutting blades. When the container is filled with cutting blades, end caps 7 and 8 are telescoped over the ends of the container to maintain the blades in a clean condition. The blades are sterile, and may be sterilized either before or after being packaged in the container. It will be noted, also, that when the container is put to use it is a simple expedient for the operator to merely pull off the end caps, but the operator's hand need never contact either terminal blade so that the sterile condition of the blades is maintained until each individual blade is actually put to use.

When it is desired to dispense the blades, it is a simple expedient to remove the end caps 7 and 8 from the container, and deposit the container bodily in an open-topped housing 9, as seen in FIGURES 3, 4 and 5, with the end of the container abutting inturned flanges 9a on the housing. With reference to FIGURE 5 it will be noted that the bottom of the housing 9 is provided with a slot 10 which will be in alignment with the slot 5 in the bottom of the container 1, so that a blade may be discharged not only from the container but through the slot in the housing. The blades, as each successive blade is discharged, are moved forwardly in the housing by means of a plunger 11 having a head 12 thereon which passes through the marginal wall 6 of the container and abuts the end blade of the stack. The plunger is constantly urged toward the discharge end of the container 1 by means of a coil spring 13 bearing against the plunger head 12 and against the reinforcement 14 at the outer end of the housing, the plunger itself extending through a suitable aperture 15 in the reinforcement and housing end.

When in use, in a can opening mechanism or the like, the blades may be automatically dispensed one at a time by the aid of an arm or bracket 16 having a depending blade pushing portion 17 thereon. The arm may automatically be actuated upwardly and downwardly and upon a downward movement will enter the slot 4 at the top of the container 1 and push out the terminal blade through the slots 5 in the container and 10 in the housing, the other blades moving in position for the next adjacent blade to be forced out upon the subsequent stroke of the pusher 17, by means of the plunger 11. The operation may be as slow or rapid as desired and can continue automatically until the entire stack of blades is used. After which it is a simple expedient to remove the empty container and replace it with a full one.

From the foregoing, it is apparent that we have provided an economical yet highly efficient magazine or container for a stack of cutting blades from which the blades may be automatically dispensed one at a time without any adjustment to the magazine except for the removal of the end caps at the time the magazine is placed in position. The end caps maintain the blades in a sterile condition while the magazine is not in use, and the sterility of the blades is maintained until each blade is individually put to use. The entire structure of the magazine, as well as the stack of blades is extremely economical.

It will be understood that modifications and variations may be effected without departing from the scope of the novel concepts of the present invention.

We claim as our invention:

In combination, a trough-like housing having a wall portion at one end, a plunger in said housing, a head on said plunger, spring means around said plunger between said head and said wall portion biasing said plunger toward the other end of said housing, a magazine seated in said housing comprising a container having open ends, a stack of cutting blades in said container, said plunger head bearing against the terminal blade at one end of said container, abutment means for said magazine at the other end of said housing, both said container and said housing having a slot therein adjacent the other end of said container for the successive discharge of said blades, and said magazine having another opening therein to accommodate blade ejecting means.

References Cited in the file of this patent
UNITED STATES PATENTS

| | | |
|---|---|---|
| 632,231 | Blades | Sept. 5, 1899 |
| 757,993 | Coleman | Apr. 19, 1904 |
| 1,365,516 | Luellen | Jan. 11, 1921 |
| 1,844,318 | Gaisman | Feb. 9, 1932 |
| 1,926,436 | Eldean | Sept. 12, 1933 |
| 1,999,129 | Minnelli | Apr. 23, 1935 |
| 2,034,516 | Hunt et al. | Mar. 17, 1936 |
| 2,065,748 | Rodriques | Dec. 29, 1936 |
| 2,281,191 | Eddy et al. | Apr. 28, 1942 |
| 2,330,806 | Benjamin | Oct. 5, 1943 |
| 2,431,523 | Tuerff et al. | Nov. 15, 1947 |
| 2,499,969 | Quintrell | Mar. 7, 1950 |
| 2,697,276 | Austin | Dec. 21, 1954 |
| 3,021,031 | De Nicolo | Feb. 13, 1962 |